United States Patent [19]
Grosser et al.

[11] 3,968,964
[45] July 13, 1976

[54] VAULTING BOARD

[75] Inventors: Richard W. Grosser, Boone; Virgil L. Long, Jefferson, both of Iowa

[73] Assignee: AMF Incorporated, White Plains, N.Y.

[22] Filed: Jan. 28, 1975

[21] Appl. No.: 544,897

[52] U.S. Cl. .................................. 272/65; 267/160
[51] Int. Cl.[2] .................................. A63B 5/08
[58] Field of Search ................ 267/160; 272/66, 65

[56] References Cited
UNITED STATES PATENTS

| | | | |
|---|---|---|---|
| 3,062,542 | 11/1962 | Evancha | 272/66 |
| 3,408,061 | 10/1968 | Meyer | 267/160 |
| 3,814,420 | 6/1974 | Encke | 272/66 |

*Primary Examiner*—James B. Marbert
*Attorney, Agent, or Firm*—George W. Price; Walter Lewis

[57] ABSTRACT

The vaulting board has leaf springs with rollers at their opposite ends, and the effective length of the leaf springs can be changed by changing the roller spacing.

5 Claims, 2 Drawing Figures

U.S. Patent    July 13, 1976    3,968,964
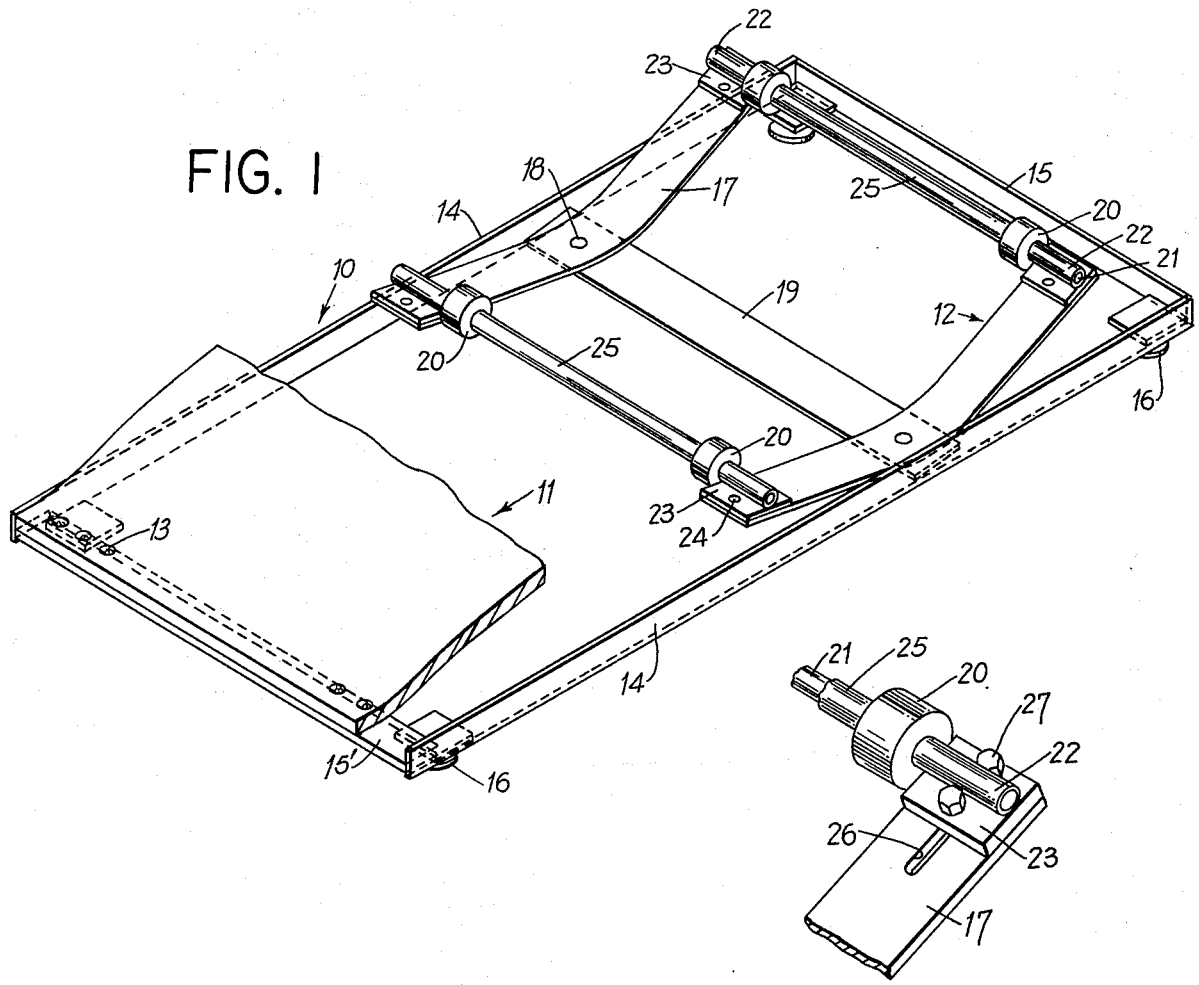
FIG. 1
FIG. 3
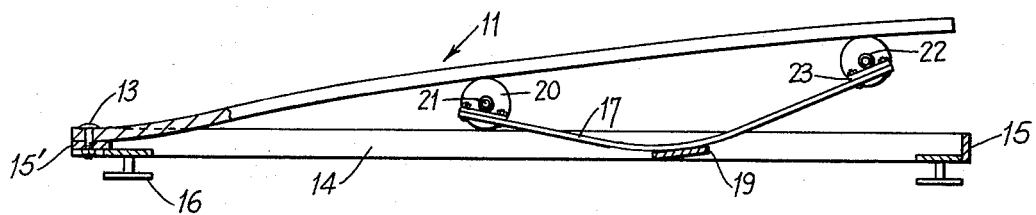
FIG. 2

VAULTING BOARD

This invention relates to an improved vaulting board device, and more particularly, to improved spring means therefor which is low cost, uncomplicated, readily fabricated and easily adjustable.

A preferred form of the invention is illustrated in the attached single sheet of drawings wherein FIG. 1 is a broken away perspective view of the device; FIG. 2 is a side elevation view thereof; and FIG. 3 is a perspective view of an exemplary adjustment means therefor.

As seen from the drawings, the device comprises the basic elements of a support frame or base 10, an overlying board 11, and an intervening spring mechanism 12. Both the frame 10 and board 11 are generally rectangular in shape, with one end of the board 11 being fixed to the frame 10 as by studs 13, whereas the remainder of the board is free to move with respect to the frame. As is usual in the art, the board can be a multiply wood board having an upper non-slip surface. The frame comprises iron side and end pieces 14 and 15, 15' which are welded together, and non-skid type footings 16 can be provided at each corner of the frame.

The improved spring mechanism comprises a pair of elongated metallic leaf springs 17 which have a shallow concave or bow shape. At their central portions the springs 17 are fixed to opposite sides of the frame as by welds 18 with the opposite ends of a crosspiece 19 which is fixed to the frame. Rollers 20 are mounted at the opposite elevated free ends of the springs, and these rollers 20 make rolling contact with the underside of the board 11.

Rollers 20 are mounted on axles 21. Opposite ends of the axles 21 enter bearing sleeves 22 fixed to opposite ends of the springs. The sleeves 22 can be welded to pads 23 and the pads 23 in turn connected to the springs by welds 24. Each pair of rollers on each axle is spaced by a spacer sleeve 25 so that the rollers are positioned just inside the bearing sleeves along opposite sides of the frame.

The leaf spring art, of course, is well developed, so that leaf springs with the desired shape and spring rate can be readily obtained on the marketplace. The rollers 20 reduce friction between the spring mechanism 12 and board so that the response of the board to the spring mechanism is relatively fast and quiet. In addition, since the invention utilizes simple components that are readily available on the marketplace, the device is low cost, uncomplicated and readily fabricated, as compared to the vaulting board spring mechanism of the prior art.

The invention also makes it very easy to provide a feature of adjustability for the device. As seen in FIG. 3, instead of permanently mounting the rollers on the springs, the mounting can be made adjustable. This is done by omitting the welds 24 and forming slots 26 in the free ends of the springs and connecting the pads 23 to the springs by means such as studs 27 in the slots 26. By loosening the studs 27 and then retightening them, the position of the two axles with respect to each other can be readily selectively adjusted. That is to say, the spacing between the rollers 20 can be readily changed towards or away from each other which is the same as changing the effective length or spring rate of the leaf springs.

What we claim as our invention is:

1. A vaulting board device comprising a generally rectangular shaped base frame, a generally rectangular shaped board overlying said frame, one end of said board being fixed to one end of said frame and the other end of said board being free with respect to said frame for movement towards and away therefrom, a pair of elongated leaf springs positioned beneath said board, said leaf springs being fixed at their central portions to said frame along opposite sides thereof, opposite ends of said springs being free with respect to said frame for movement towards and away therefrom, and roller means on the ends of said springs in contact with the underside of said board.

2. In a vaulting board device as in claim 1, wherein said leaf springs are metallic and have a generally shallow concave shape whereby the opposite free ends thereof are elevated above the fixed central portions thereof.

3. In a vaulting board device as in claim 2, means for adjusting said device comprising an adjustable mounting for said roller means on said free leaf spring ends for varying the spacing between said rollers.

4. In a vaulting board device as in claim 3, tubular bearing sleeves mounted on the free ends of said springs, a pair of axles extending between respective opposite free ends of said springs into the bearing sleeves mounted thereon, a pair of annular rollers on each of said axles, and a spacer sleeve on each of said axles between the pair of annular rollers thereof to retain the same position adjacent the bearing sleeves therefor.

5. In a vaulting board as in claim 4, wherein said adjusting means comprises a mounting pad for each of said bearing sleeves, a lengthwise extending slot formed in each free end of said springs, said pads being connected to the free ends of said springs by stud means extending through said slots for selective adjustment of the spacing between the pairs of rollers at corresponding opposite ends of said springs.

* * * * *